UNITED STATES PATENT OFFICE.

FRIEDRICH NOBBE AND LORENZ HILTNER, OF THARAND, GERMANY.

INOCULATION OF THE SOIL FOR CULTIVATING LEGUMINOUS PLANTS.

SPECIFICATION forming part of Letters Patent No. 570,813, dated November 3, 1896.

Application filed August 9, 1895. Serial No. 558,771. (No model.)

*To all whom it may concern:*

Be it known that we, FRIEDRICH NOBBE and LORENZ HILTNER, of Tharand, Germany, have invented certain new and useful Improvements Relating to the Inoculation of Soil for the Cultivation of Leguminous Plants; and we do hereby declare the following to be a clear and exact description of the invention.

Since the function of the root nodules or tubercles of the *Leguminosæ* in the supply of nitrogen to these plants has been discovered by the fundamental researches of Hellriegel we have been working on this problem for a number of years, and have more especially examined the bacteria identified in the said root nodules or tubercles in the meantime by Beyerinck and obtained by him in pure cultures, in order to state the relation between the bacteria and the reception of the free inactive nitrogen of the air in the soil by the various kinds of *Leguminosæ*. These researches have resulted, in the first place, in the confirmation of the at that time still-disputed fact that the introduction of these bacteria into soil produces, without exception, in soil free from these bacteria, the root nodules or tubercles on the plants in question having papilionaceous flowers and enables these growths to assimilate the free nitrogen. A soil inoculated with these bacteria, even when it contains absolutely no nitrogen in an assimilable form, so that the plants without any such inoculation would starve, enables the *Leguminosæ* to produce as rich a yield of dry material and nitrogen as they would otherwise produce if grown in a richly-manured soil containing much assimilable nitrogen.

It has been established by us as an entirely new fact that the tubercle bacteria of the various *Papilionaceæ* are of full strength (*i. e.*, in the production of efficient nodules or tubercles) only with that species from whose root-tubercles they were themselves obtained. With nearly-allied species they are of weaker strength, and with systematically-different species they are useless. Bacteria cultures from pea-roots, for example, are quite useless for *Robinia* plants, while they promote the growth of peas in an extremely energetic manner, and that of the allied vetches somewhat more feebly; and, on the other hand, the bacteria from *Robinia* nodules or tubercles are quite efficient with *Robinia* plants, but in a lesser degree with *Colutea*, and are absolutely useless with peas.

At first sight it might possibly be thought that the production, transport, and distribution of such large masses of crude inoculating material as would appear to be necessary for the sufficient impregnation or treatment of large areas of land would be very difficult and costly, and therefore not practicable, while there would also be the danger that in the crude inoculating material, besides the active bacteria of the root nodules or tubercles, there would be carried from field to field at the same time microscopic organisms which would be detrimental to growth and would more or less interfere with the action of the inoculating material. Our process is, however, free from any such objections as those above mentioned, inasmuch as bacteria bred in quantities directly from the nodules or tubercles of the *Leguminosæ* in pure cultures are used as the inoculating material. Farmers are thereby placed in a position to make land which was unfruitful by reason of its lack of nitrogen fit for the cultivation of fodder and other plants belonging to the order of the *Leguminosæ* and to insure and increase the yield of better soils. This inoculation has, moreover, an essentially practical bearing in connection with the so-called "green manuring."

Our process of inoculating land with tubercle bacteria is to be carried out as follows: The active bacteria for growth with the *Leguminosæ* are delivered to the farmer in glass tubes or other suitable packages, which contain pure colonies thereof in agar-gelatin having suitable additions for propagating such bacteria, as, for instance, sugar asparagin, an aqueous extract of the green substance of *Leguminosæ*. In some cases the bacteria can also be prepared for transport in fluid cultures. The colonies in agar-gelatin are distributed in water, together with the agar-gelatin, by the user (after removing the stopper) in the proportion, for example, of the contents of one glass tube to from one to three liters of water, which is previously mixed with a suitable material, such as an aqueous extract of the green substance of *Leguminosæ* sugar asparagin, for propagating the bacteria. This propagating material is delivered with the bacteria-tubes. Preferably the glass tube is laid in the water until the agar-gelatin is dissolved.

Immediately before sowing, the whole of the emulsion prepared as above mentioned is poured over the seeds. The amount of water added for each kind of seed is so proportioned that after the seeds have been thoroughly and uniformly moistened by a careful working over by hand a surplus of liquid will still remain. For clover-seed, for example, for twenty kilograms of seed the admixture of three liters of water with the contents of three glasses of inoculating material (each glass containing, for instance, three cubic centimeters agar-gelatin with pure cultures) is sufficient. For more bulky seeds a somewhat larger amount of water is required.

A sufficient quantity of dry sand or earth from the field to be sown is then gradually added, with careful stirring, until the body of seed is in a suitable condition for sowing by hand or by means of a sowing-machine.

We claim as our invention—

For the inoculation of seed with purely-cultivated bacteria, the process essentially consisting in wetting the seed with an emulsion of pure cultures, mixing therewith while continuously stirring a nourishing material adapted to facilitate the augmentation of the bacteria and then adding dry earth, sand or a similar small-grained material in such an amount that the seed-grains cease to agglomerate and become adapted to be sown.

FRIEDRICH NOBBE.
LORENZ HILTNER.

Witnesses:
HERNANDO DE SOTO,
PAUL ARRAS.